United States Patent [19]

Caia et al.

[11] Patent Number: 5,631,927
[45] Date of Patent: May 20, 1997

[54] SHIFTING CIRCUIT FOR A TRANSMISSION SYSTEM WITH MULTIPLE LINKS

[75] Inventors: Jean-Michel Caia, Brive la Gaillarde; Alain Dahiot, Ussac, both of France

[73] Assignee: Lucent Technologies Inc., Murray Hill, N.J.

[21] Appl. No.: 488,538

[22] Filed: Jun. 7, 1995

[30] Foreign Application Priority Data

Jun. 17, 1994 [FR] France .................................. 94 07461

[51] Int. Cl.$^6$ .................................................. H04K 1/00
[52] U.S. Cl. .......................................................... 375/260
[58] Field of Search ...................................... 375/226, 260, 375/267, 299, 347; 455/59, 60, 61, 101, 132, 136; 370/16; 340/825.01

[56] References Cited

U.S. PATENT DOCUMENTS 4,744,095  5/1988  Comet et al. ........................ 315/349
5,448,573  9/1995  Yamaguchi ....................... 395/182.02

FOREIGN PATENT DOCUMENTS 0137563  10/1984  European Pat. Off. .

Primary Examiner—Stephen Chin
Assistant Examiner—Kevin Kim

[57] ABSTRACT

Transmission system comprising at least two links for connecting a transmitter and a receiver, and receiver suitable for such a system.

Transmission system comprising at least two channels for connecting a transmitter and a receiver. The receiver comprises receiving circuits (20 and 31) for receiving the data coming from the channels, a coincidence providing circuit (30) for the data coming from said channels, formed by:
  detection circuit (66, 67) for detecting the shift between the data from the channels to produce shift information,
  a shifting circuit for shifting the data of at least one of said channels as a function of said shift information,
a switching circuit (35) for connecting a user circuit to either of said channels.

The shifting circuit is formed by:
  a first deserializing circuit (98) for producing N-bit words based on received data,
  a permutation circuit (108) for producing permuted words by permuting the bits of the N-bit words as a function of said shift information,
  a plurality of second deserializing circuits (110) for connecting each of the N outputs of the permutation circuit in parallel to M outputs by taking from the buffers the data as a function of the shift information.

5 Claims, 7 Drawing Sheets 5,631,927

SHIFTING CIRCUIT FOR A TRANSMISSION SYSTEM WITH MULTIPLE LINKS

BACKGROUND OF THE INVENTION

1. Field of the Invention

The present invention relates to a transmission system comprising at least two transmitter channels for connecting a transmitter and a receiver.

2. Description of the Prior Art

Systems of this type provide on the side of the transmitter:
means for transmitting transmit data by at least two channels, and on the side of the receiver:
  receiving circuits for receiving the data coming from the channels,
  a coincidence providing circuit for the data coming from said channels, formed by:
    a detection circuit for detecting the shift between the data coming from the channels, to produce shift information,
    a shifting circuit for shifting the data of at least one of said channels as a function of said shift information,
  a switching circuit for connecting a user circuit to one of said channels.

The invention likewise relates to a receiver suitable for such a system.

Systems of this type find important applications in the field of digital data transmission by radio waves or others. This type of system includes means for remedying failures of a transmitter channel. These means are formed by the presence of a help channel. The problem then posed is the passing through this help channel and the return to the normal channel. These channel changes are to be effected without the user noticing what it is, thus without data loss. This is called hitless. This should only happen if the data coming from the two channels coincide binary digit by binary digit (bit by bit).

A system of this type is described in European Patent Application no. 0 137 563. Although this system gives complete satisfaction, it has been established that this system is unsuitable, one the one hand, when the data coming from these channels present a shift that is more than several bits and, on the other hand, was unsuitable for processing data at a high rate.

SUMMARY OF THE INVENTION

The present invention proposes a system of a type defined in the opening paragraph which offers the possibility of correcting large differences, typically a dozen, and is capable of operating for rates of the order of several hundreds of megabits per second.

Therefore, such a system is characterized in that the shifting circuit is formed by:
  a first deserializing circuit for producing N-bit words based on received data,
  a permutation circuit for producing permuted words by permuting the bits of the N-bit words as a function of said shift information,
  a plurality of second deserializing circuits for connecting each of the N outputs of the permutation circuit in parallel to M outputs by taking from the buffers the data as a function of the shift information.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENT(S)

Figure 1:
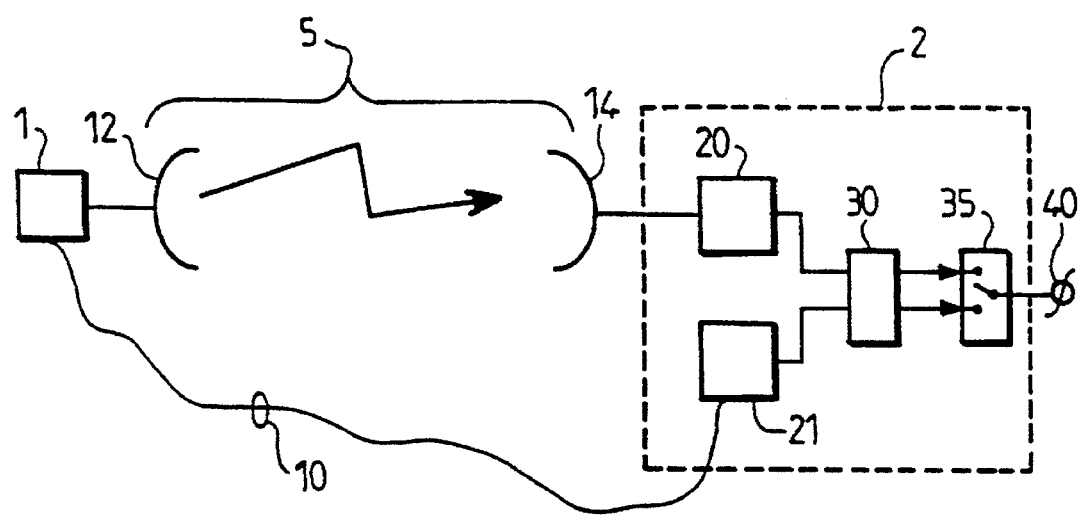
FIG. 1 shows a transmission system according to the invention.

The system shown in FIG. 1 is formed by a transmitter unit and a receiver unit 2. These two units are connected by two transmitter channels 5 and 10. For example, the transmitter channel 5 is a radio channel connecting a transmitter aerial 12 connected to the transmitter unit 1 with a receiver aerial 14 connected to the receiver unit 2, whereas channel 10 is a wire link connecting these two units 1 and 2. These two channels can transmit the same information, so that the one can help the other. For receiving the information signals coming from these two channels, the receiver unit 2 comprises two receiving circuits 20 and 21 assigned to the channels 5 and 10, respectively. As the channels 5 and 10 have of necessity different transmission times, a coincidence providing circuit 30 for the information may suitably be provided, so that either of said channels may be switched to by a switch 35 without a user connected to an output terminal 40 noticing this change of channel.

Figure 2:
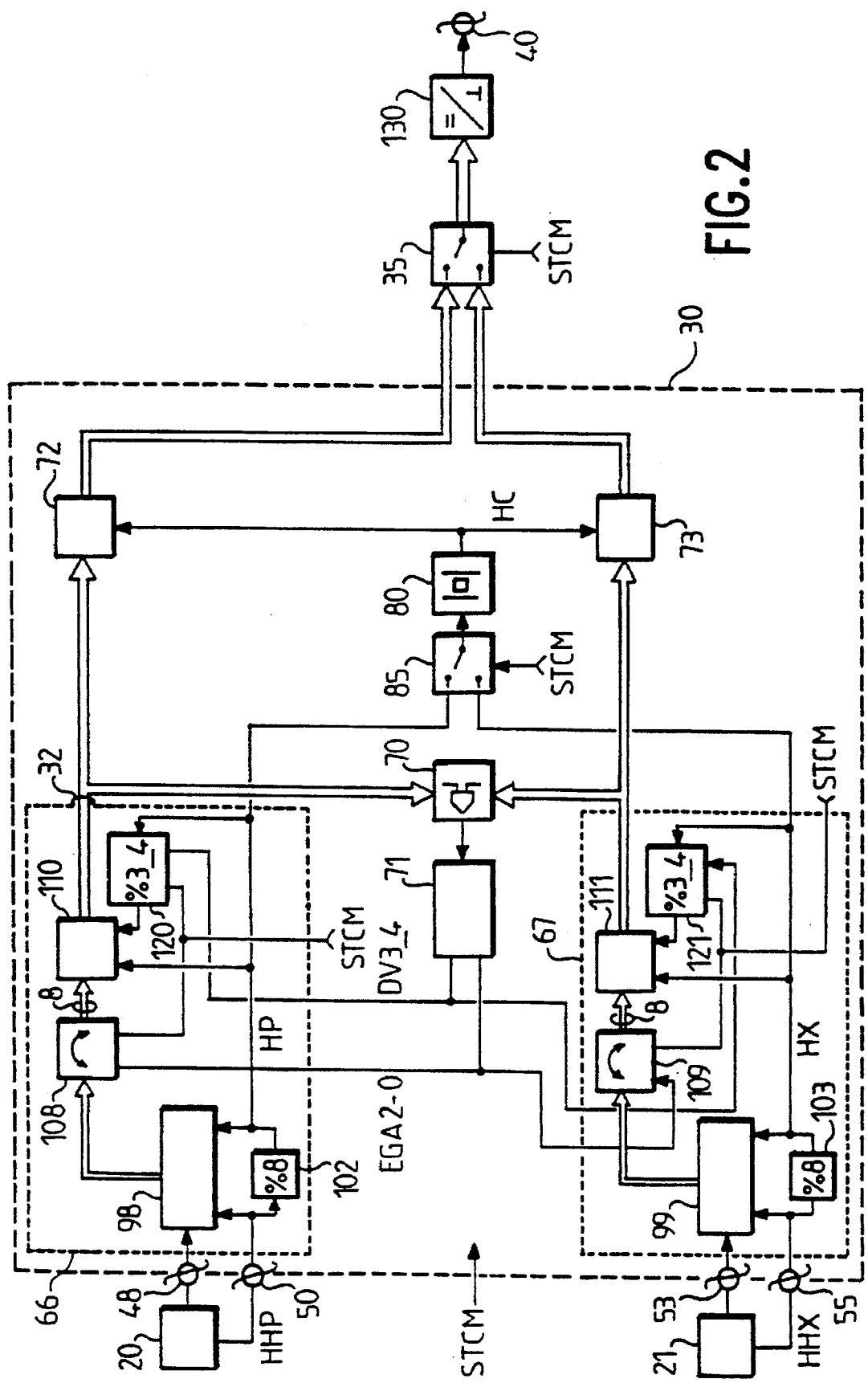
FIG. 2 shows the diagram of a coincidence providing circuit which forms part of the system according to the invention.

The coincidence providing circuit 30 shown in FIG. 2 has two accesses 48 and 50 for connection to the output of the receiving circuit 20 and two accesses 53 and 55 for connection to the output of the receiving circuit 21. The accesses 48 and 53 are assigned to the data which appear in a serial form and the accesses 50 and 55 to the clock signals HHP and HHX which accompany them and provide the timing of these serially transmitted data. The data are applied to the respective shifting circuits 66 and 67 which, as a function of the behaviour of the signals EGA2-0 and DV3_4, shift the bits so as to ensure that said coincidence occurs. This coincidence is detected by a comparing circuit 70 which applies its result to an automaton circuit 71, so that the latter can produce the signals EGA2-0 and DV3_4. Buffer circuits 72 and 73 respectively, allow of the production of data in timing with a clock signal HC which comes from a local clock 80 locked on to one of the timing signals derived from the accesses 50 and 55. This choice is made by a switch 85 whose inputs receive the signals HP and HX derived from the signals HHP and HHX. The command of this switch is the same as that of switch 35. This command is provided by a signal STCM which thus defines the channel used to terminal 40.

According to the invention, the shifting circuits 66 and 67 are formed by first deserializing circuits 98 and 99, so that the data which are presented in a serial form at accesses 48 and 53 are presented in a parallel form. Eight-bit-long words are thus produced on the outputs of these circuits 98 and 99. These words are accompanied by assigned clock signals HP and HX obtained by dividing circuits 102 and 103 which divide the frequency of the signals HHP and HHX by eight. These words are then applied to permutation circuits 108 and 109 which permute according to a circular permutation the bits that form said words as a function of the shift information EGA2-0 processed by the automaton circuit 71. Various second deserializing circuits represented by way of blocks 110 and 111 in FIG. 2 deserialize each of the eight outputs of the permutation circuits 108 and 109. Within the framework of this described example, this is a fourth order deserialization, so that the number of outputs of the blocks 110 and 111 is 32. Variable dividers 120 and 121 make it possible to shift the information signals once more in a manner which will be explained below. The dividing factor, in this case three or four, is defined by the shift information DV3_4 processed by the automaton circuit 71. It will be observed that the switch 35 switches the data which occur in the form of thirty-two bits. This allows of the operation at a frequency much lower than the rhythm of the serial data. A serializing circuit 130 can be used at the output of the switch 35 if serial data are necessary on terminal 40.

Figure 3:
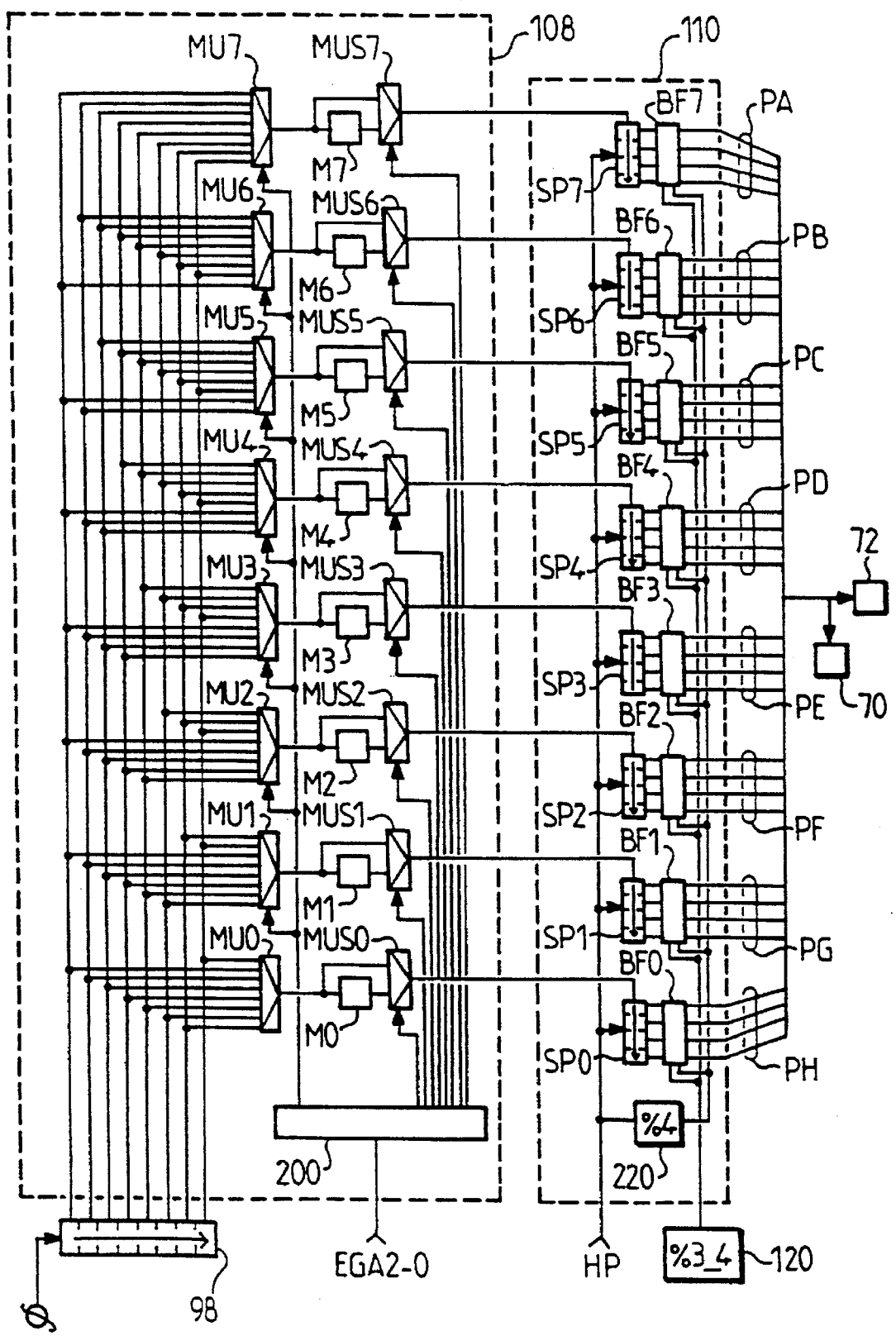
FIG. 3 shows in detail an embodiment of the permutation circuit which forms part of the system according to the invention.

The structure of the permutation circuit 108 is shown in detail in FIG. 3. The structure of the circuit 109 may evidently be identical.

The circuit is formed by a set of multiplexers MU0, MU1, ..., MU7 whose inputs are branched in a manner which will be explained below by means of Table I. The switch position of these multiplexers is controlled by a single signal formed by a control circuit 200 which processes the signal EGA2-0. In the following the bit sequence: ..., $e_{-7}$, $e_{-6}$, $e_{-5}$, ..., $e_0$, $e_1$, $e_2$, and $e_3$, ... will occur which are considered in circuit 98 in time intervals running from the past to the present. The bits at the output of these multiplexers MU7 to MIJ0 will be given by the Table I below.

TABLE I

| EGA2-0 | Code on the outputs MU0 to MU7 |
|---|---|
| 000 | $e_7\ e_6\ e_5\ e_4\ e_3\ e_2\ e_1\ e_0$ |
| 001 | $e_6\ e_5\ e_4\ e_3\ e_2\ e_1\ e_0\ e_7$ |
| . | . |
| . | . |
| . | . |
| 111 | $e_0\ e_7\ e_6\ e_5\ e_4\ e_3\ e_2\ e_1$ |

Circuit 108 also includes a memory element M0 to M7 for storing the bit on the output of the multiplexers MU0 to MU7. Two-position multiplexers MUS0 to MUS7 also controlled by the control circuit 200 make it possible to produce on the outputs of the circuits 108 either the stored bit or the bit on the output of the multiplexers MU0 to MU7. The Table II below explains the word finally processed by the permutation circuit 108. In this Table the bits $e_{-1}$, $e_{-2}$, ... will occur which successively lie before $e_0$.

TABLE II

| EGA2-0 | Code on the outputs of circuit 108 |
|---|---|
| 000 | $e_7\ e_6\ e_5\ e_4\ e_3\ e_2\ e_1\ e_0$ |
| 001 | $e_6\ e_5\ e_4\ e_3\ e_2\ e_1\ e_0\ e_{-1}$ |
| . | . |
| . | . |
| . | . |
| 111 | $e_0\ e_{-1}\ e_{-2}\ e_{-3}\ e_{-4}\ e_{-5}\ e_{-6}\ e_{-7}$ |

Circuit 110 is created based upon shift registers SP0 to SP7 which receive, respectively, the bits on the outputs of the multiplexers MUS0 to MUS7. These bits are shifted in timing with the clock signals HP. The parallel outputs of these registers are connected to memory inputs BF0 to BF7, respectively. These memories are read in timing with the output signals of a divider 220 which divides the signals HP by four and produces a signal HP/4. These memories are written in timing with the output signal of the variable divider 120. The memories produce words of thirty-two bits on groups of four outputs PA, PB, PC, PD, PE, PF, PG and PH. The groups of outputs of the memories which are equivalent to circuit 111 are referenced XA, XB, XC, XD, XE, XF, XG, XH.

When the dividing factor is equal to four, the bits occur in the manner indicated in the Table III below.

TABLE III

| | OUTPUT |
|---|---|
| BF0 | $e_0\ e_8\ e_{16}\ e_{24}$ |
| BF1 | $e_1\ e_9\ e_{17}\ e_{25}$ |
| . | . |
| . | . |
| . | . |
| BF7 | $e_7\ e_{15}\ e_{23}\ e_{31}$ |

Figure 4:
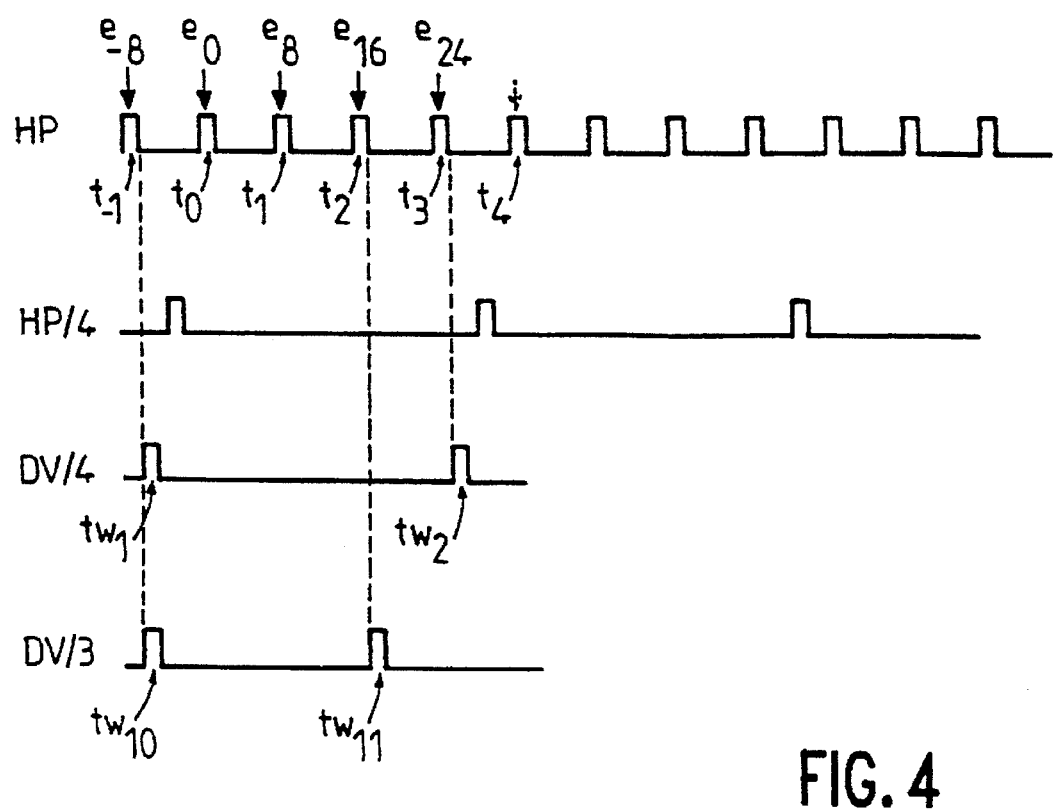
FIG. 4 is a time diagram in explanation of the operation of the deserializing circuit which forms part of the system according to the invention.

FIG. 4 shows a time diagram intended to explain the operation of circuit 110. This time diagram particularly relates to register SP0 and memory BF0. Thus, in timing with the signal HP, the bits $e_{-8}$, $e_0$, $e_8$, $e_{16}$, $e_{24}$, ... enter the shift register SP0 at the respective instants $t_{-1}$, $t_0$, $t_1$, $t_2$, $t_3$, ... The line DV/4 shows the pattern of the write signals in the memory BF0. In this time diagram are shown on this line DV/4 two write instants tw1 and tw2 while the dividing factor is four. The bits $e_0$, $e_8$, $e_{16}$, $e_{24}$ are thus stored in memory BF0 at instant tw2. At instant tw1 it was the bits $e_{-32}$, $e_{-24}$, $e_{-16}$ and $e_{-8}$ that were stored. Now the line DV/3 will be considered which corresponds to the case where the dividing factor is three. On this line the instants tw10 and tw11 are singled out. The instant tw10 corresponds to the instant tw1. It is from this instant tw10 on that the dividing factor goes to three. At the instant tw11 only three bits are written in the register SP0, thus it is the binary elements $e_{-8}$, $e_0$, $e_8$, $e_{16}$ that are finally stored in the memory BF0. The Table IV below summarizes that which has just been said for the dividing factor of three. Thus, it will be noticed that a shift by one octet is obtained. If the number of positions of the shift registers SP0 to SP7 are called M, and the number of positions of the shift register 98 (and 99, respectively) are called N, it may be shown that the correction range is equal to: N×(M−1) bits, that is to say, in our example 24:

TABLE IV

| | OUTPUT |
|---|---|
| BF0 | $e_{-8}\ e_0\ e_8\ e_{16}$ |
| BF1 | $e_{-7}\ e_1\ e_9\ e_{17}$ |
| . | . |
| . | . |
| . | . |
| BF7 | $e_{-1}\ e_7\ e_{15}\ e_{23}$ |

Figure 5:
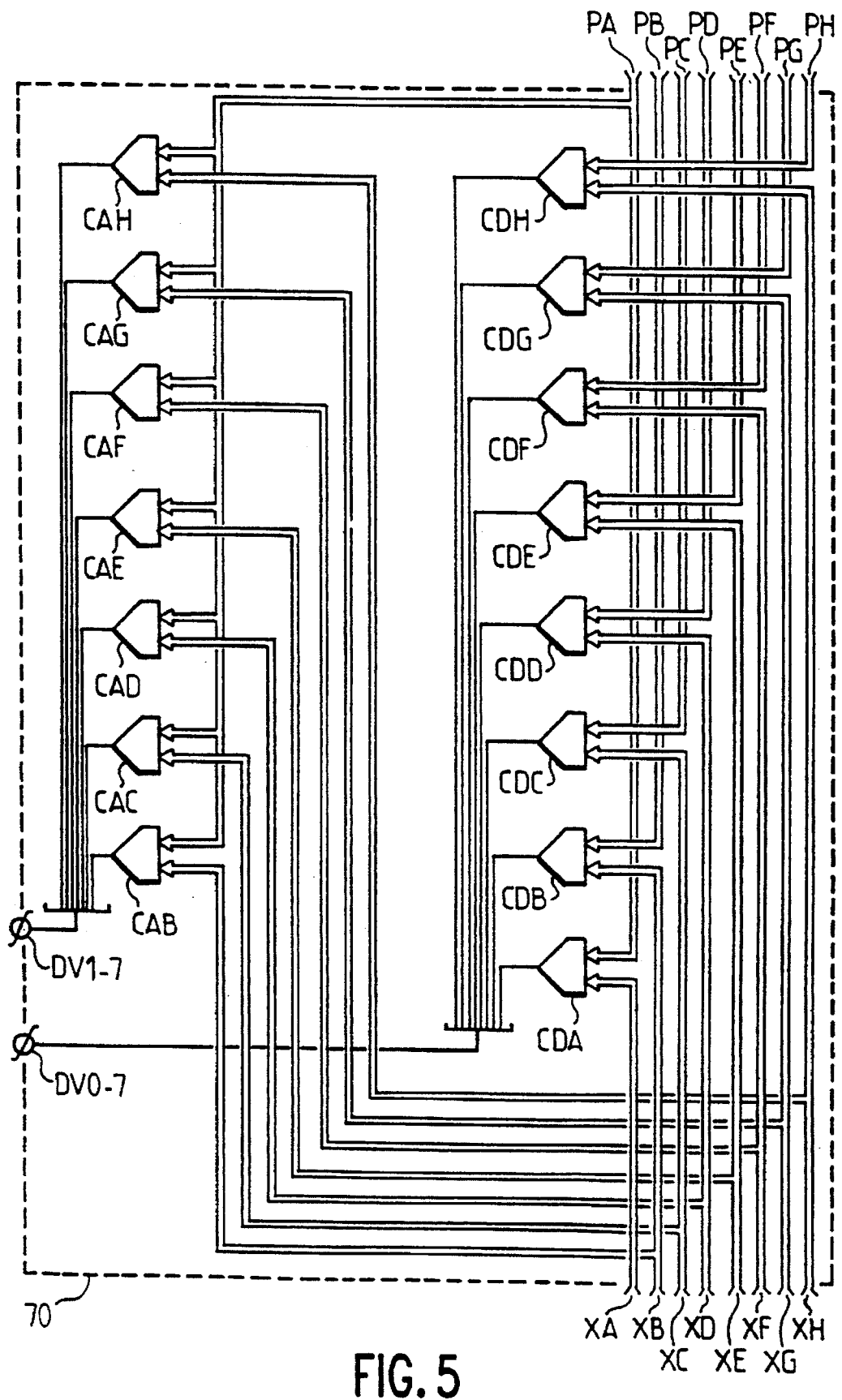
FIG. 5 shows the structure of a comparing circuit which forms part of the system according to the invention.

The comparing circuit 70 shown in FIG. 5 is formed by a first series combination of comparators CDA, CDB, ..., CDH which compare in pairs the four-bit words on the outputs PA, PB, ... PH of circuit 110 and on the corresponding outputs XA, XB, ..., XH of circuit 111. Thus comparator CDA compares the word on the output PA with the word on the output xA. In this manner logical signals are produced on the outputs DF0-7. A second series of comparators CAB, CAC, CAD, ... CAH compares the word of the output PA with the words on the outputs XA, XB, ..., XH. Thus logical signals are produced on the outputs DV1-7. These signals are used by the automaton circuit 71.

Figure 6:
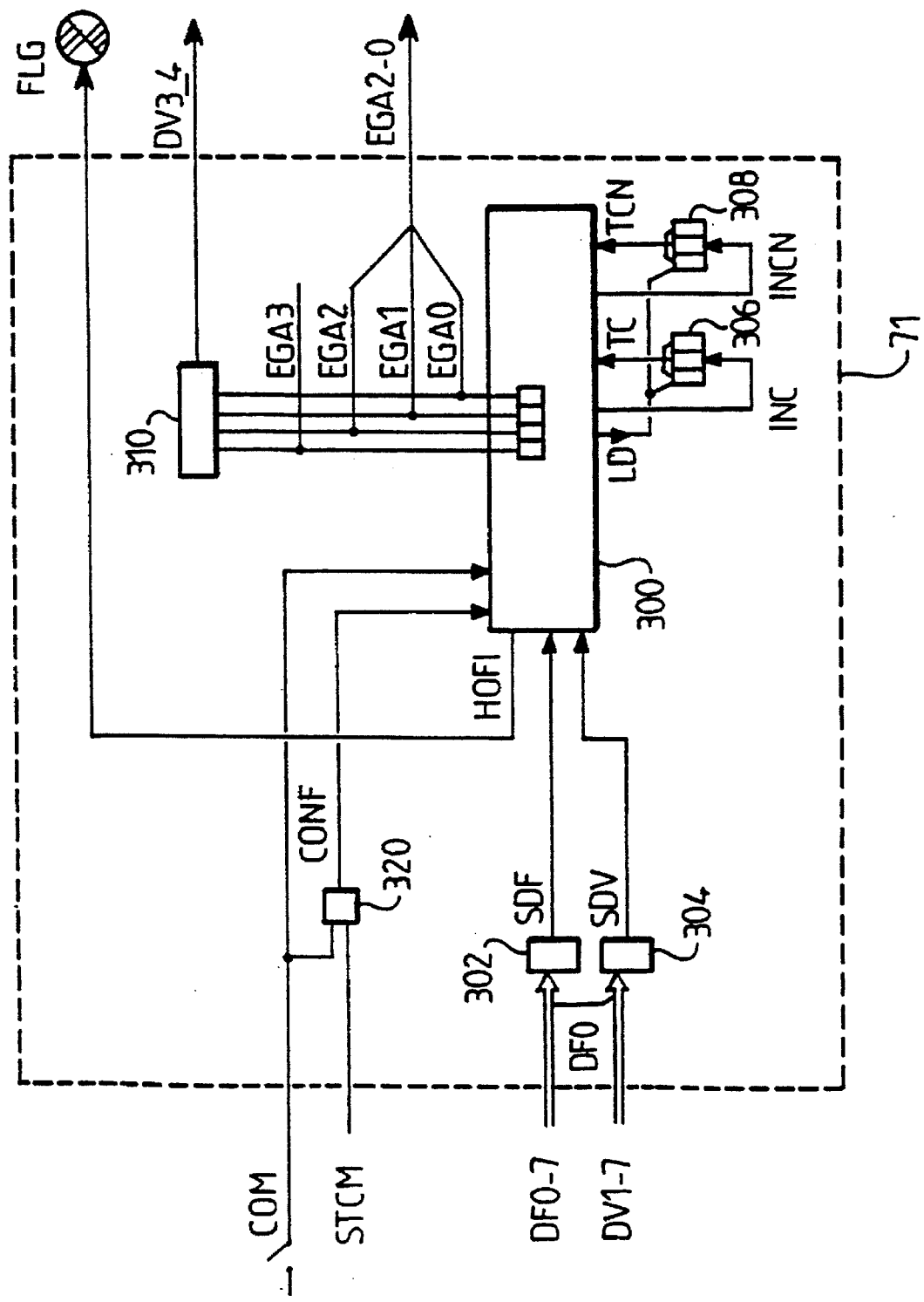
FIG. 6 shows the diagram of an automaton circuit which forms part of the system according to the invention.
Figure 7:
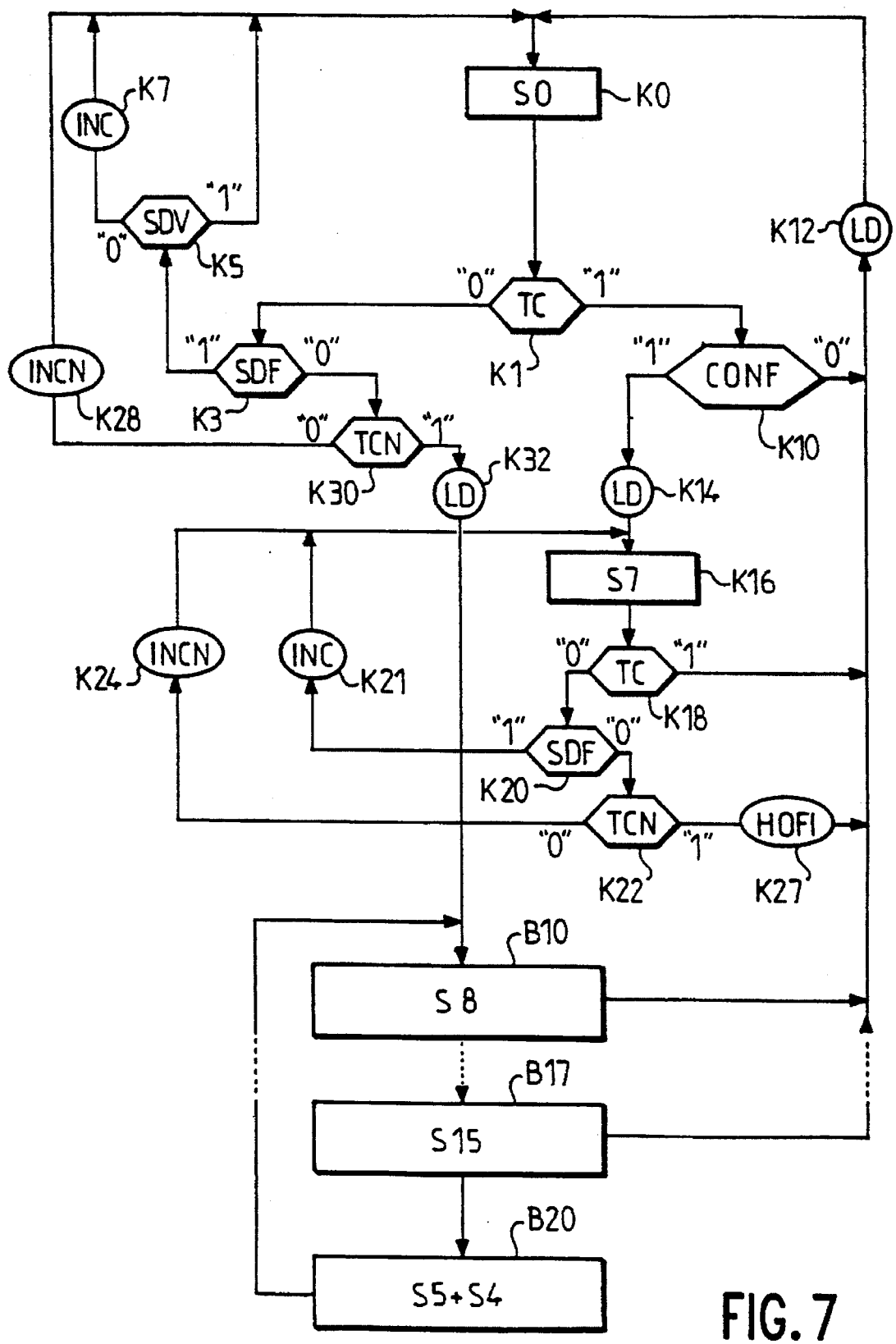
FIGS. 7 to 9 are flow charts showing the operation of the automaton circuit of FIG. 6.

FIG. 6 shows a diagram in which this automaton circuit is established.

It is formed around a state circuit 300. This circuit defines a plurality of states to be given in Table V below.

TABLE V

| STATES | CONNOTATIONS |
| --- | --- |
| S0 | rest |
| S4 | delay |
| S5 | shift by one octet (110) |
| S7 | switching state |
| S8 | permutation of 1 bit (108) |
| S9 | permutation of 2 bits (108) |
| S10 | permutation of 3 bits (108) |
| S11 | permutation of 4 bits (108) |
| S12 | permutation of 5 bits (108) |
| S13 | permutation of 6 bits (108) |
| S14 | permutation of 7 bits (108) |
| S15 | permutation of 8 bits (108) |

The changes of state are given in the flow charts of FIGS. 6, 7, 8 and 9. The automaton circuit 71 comprises two logical circuits 302 and 304. The circuit 302 produces a signal SDF which is an "AND" logical signal from all the signals DF0-7. This signal SDF, when it has the "1" value, indicates a coincidence of the bits of channel 5 with the bits of channel 10. The circuit 304 produces a signal SDV which is an "AND" logical signal from the signals DV1-7 and the signal DF0. The circuit also comprises two counters 306 and 308 which produce respectively logical signals TC and TCN as a function of respective incrementation signals INC and INCN. These counters are initialized by a signal LD. The signal TC, when equal to "1", denotes that the counter 306 is full. This counter in fact counts the number of coincidences signalled by the signal SDF(="1"). The signal TCN, when equal to "1", denotes that the counter 308 is full. This counter in fact counts the number of non-coincidences signalled by the signal SDF(="0"). Thus, these counters make it possible not to make too hasty decisions at the occurrence of signals SDF which do not always reflect an actual situation. The signal SDV makes it possible to detect the case where the channels do not transmit valid information and thus to detect signals having zero-value data or communication silences. Signals INC, INCN and LD thus depend on states of the circuit 300. A circuit 310 detecting a state of the circuit 300 produces the signal DV3_4. A logical circuit 320 produces a signal CONF based upon the signal STCM and a signal COM, while this external signal COM denotes that one wishes to switch in an arbitrary manner to a certain channel, channel 5 or channel 10, while the value CONF=1 denotes that a change of channel is desired and the value CONF=0 that no change of channel is necessary. A signal HOFI lights a pilot lamp FLG to signal that a change of channel has taken place without coincidence having taken place.

It is possible to explain the various flow charts. To start with, one may consider the box K0 of FIG. 7. This box corresponds to the state of rest S0 of circuit 71. In box K1 the value of the signal TC is examined. If it is zero, box K3 is proceeded to and the value of signal SDF is examined. If this signal SDF is equal to "1", box K5 is proceeded to where the value of the signal SDV is tested. If this value is equal to "0", the signal INC (box K7) is activated, so that the counter 306 is incremented and state S0 is stopped at. If the value of signal SDV is equal to "1", this state S0 is stopped at, because the phase of silence is reached and the counter 306 is not incremented.

If signal TC tested in box K1 has the value "1", box K10 is proceeded to. There the relation CONF=1 is examined which means that a change of channel is to be made: if one is on channel 5, one tries to go to channel 10 and when one is on channel 10, one tries to go to channel 5. If no change of channel is desired, the counters 306 and 308 are again initialized by activating the signal LD (box K12). If a change is desired, said counters are again initialized (box K14) and state S7 (box K16) is proceeded to; the change of channel is thus effected. After this channel switching, state S0 will be returned to if the value TC tested in box K18 is equal to "1". If the latter value is equal to "0", the value SDF will be tested (box K20). If this is equal to "1", the counter 306 will be incremented (box K21) and state S7 will be returned to. If this value SDF is "0", the value TCN will be tested (box K22). A value TCN equal to "0" causes counter 308 to increment (box K24) and state S7 to be returned to. If the value TCN tested in box K22 is equal to "1", the signal HOFI will be activated (box K27) before a return is made to state S0. This signal HOFI signals that a switching has taken place, whereas the data were not brought into phase and did not coincide. This signal HOFI may trigger the lighting of the pilot lamp FLG (FIG. 6).

Figure 8:
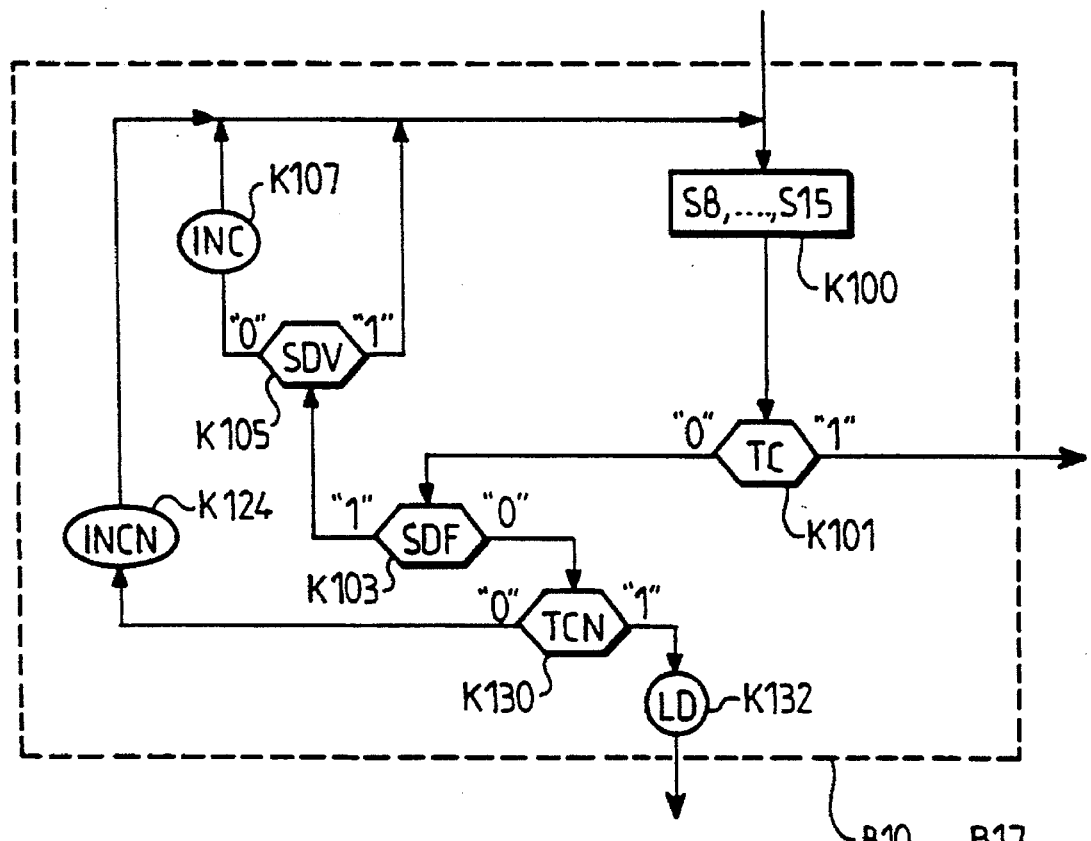
Figure 9:
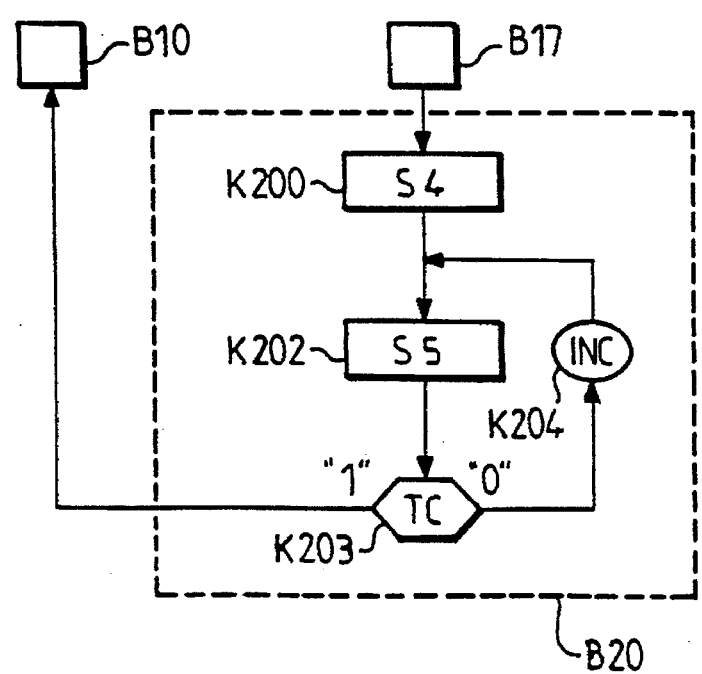

The test indicated in box K3 may also yield a negative result, that is to say, SDF="0". This calls forth a test of value TCN. If this value is zero, in box K28 the contents of the counter 308 will be incremented and box K0 will be returned to. If the value is equal to "1", the counters 306 and 308 will thus again be initialized in that they will be activated by signal LD (box K32). Then state S8 will be proceeded to which forms part of a block of boxes B10. If the explained tests in this block B10, FIG. 8, are correct, box K0 will be returned to. If these tests are not correct, states S9, ..., S16 of the blocks B11, ..., B17 will be successively proceeded to. The moment one of these tests has a correct result, state S0 of box K0 will be returned to. If the results of the test of block B17 are not correct, block B20 will be proceeded to which is linked with state S5 followed by state S4 which defines a timing necessary for implementing the shifting method. The blocks B10 to B17 comprise, as shown in FIG. 8, boxes K100, K101, ..., K132 which can be compared with boxes K0, K1, ..., K32. The block of boxes B20 shown in FIG. 9 is formed by a first box K200 which relates to state S4, after which state S5 (box K202) is proceeded to. In a box K203 a test is made of the value of TC. If this value is zero, the counter 306 will be incremented and box K202 will be returned to. If this value is "1", block B10 will be returned to for a new search of coincidence.

We claim:

1. Transmission system comprising at least two transmitter channels for connecting a transmitter and a receiver, in which system there are provided on the side of the transmitter:

means for transmitting data by at least a first and second channel, and on the side of the receiver:
receiving circuits for receiving the data coming from the first and second channels,
a coincidence providing circuit for the data coming from said channels, formed by:
a detection circuit for detecting a shift between data coming from the first channel and data coming from the second channel, to produce shift information,
a shifting circuit for shifting the data of at least one of said channels as a function of said shift information, a switching circuit for connecting a user circuit to one of said channels, characterized in that the shifting circuit is formed by:

a first deserializing circuit for producing N-bit words based on received data, a permutation circuit for producing permuted words by permuting the bits of the N-bit words as a function of said shift information, a plurality of second deserializing circuits producing an M-bit word from each of the N outputs of the permutation circuit as a function of the shift information.

2. Transmission system as claimed in claim 1, characterized in that the shift information is formed by non-coincidence information and in that an automaton circuit is provided for controlling the shifting circuit as a function of shift information, the automaton circuit more specifically comprising a non-coincidence counter for counting the number of non-coincidences which is produced by said non-coincidence information and for producing a shifting order at said shifting circuit.

3. Transmission system as claimed in claim 1 or 2, characterized in that the shift information is formed by coincidence information and in that an automaton circuit is provided for controlling the shifting circuit as a function of shift information, which automaton circuit more specifically comprises a coincidence counter for counting the number of coincidences supplied by said coincidence information and for monitoring the coincidence of said data.

4. Transmission system as claimed in claims 1 or 2, characterized in that the automaton circuit comprises means for detecting silence data for resetting the coincidence counter to zero.

5. Receiver suitable for a system as claimed in claims 1 or 2, characterized in that it comprises:

receiving circuits for receiving the data from the first and second channels, a coincidence providing circuit for the data coming from said channels, formed by:

a detection circuit for detecting the shift between data coming from the first channel and data from the second channel, to produce shift information, a shifting circuit for shifting the data of at least one of said channels as a function of said shift information, a switching circuit for connecting a user circuit to one of said channels, characterized in that the shifting circuit is formed by:

a first deserializing circuit for producing N-bits words based on received data, a permutation circuit for producing permuted words by permuting the bits of the N-bits words as a function of said shift information, a plurality of second deserializing circuits for producing an M-bit word from each of the N outputs of the permutation circuits as a function of the shift information, a buffer for storing each of the M-bit words formed from each of the N outputs of the permutation circuit.

* * * * *